United States Patent [19]

Epenoy et al.

[11] Patent Number: 4,558,455
[45] Date of Patent: Dec. 10, 1985

[54] DATA TRANSMISSION SYSTEM

[75] Inventors: Gabriel Epenoy, Vence; Roland Kuhne, La Colle sur Loup, both of France

[73] Assignee: International Business Machines Corporation, Armonk, N.Y.

[21] Appl. No.: 535,128

[22] Filed: Sep. 23, 1983

[30] Foreign Application Priority Data

Sep. 28, 1982 [EP] European Pat. Off. ........ 82430029.7

[51] Int. Cl.$^4$ .............................................. H04J 3/06
[52] U.S. Cl. ...................................... 375/112; 370/109
[58] Field of Search ......................... 375/25, 112, 7, 8; 370/77, 79, 80, 100, 108, 109

[56] References Cited

U.S. PATENT DOCUMENTS

| 3,310,626 | 3/1967 | Cassidy et al. | 370/43 |
| 3,414,818 | 12/1968 | Reidel | 375/32 |
| 3,575,557 | 4/1971 | McCowen | 370/102 |
| 3,621,397 | 11/1971 | Murotani | 375/25 |
| 3,636,524 | 1/1972 | Holland | 370/109 |
| 3,961,138 | 6/1976 | Fellinger | 375/111 |
| 4,054,754 | 10/1977 | Nicodemus et al. | 375/112 |
| 4,072,987 | 2/1978 | Walker | 375/112 |
| 4,126,764 | 11/1978 | Downey et al. | 370/102 |
| 4,187,394 | 2/1980 | Sievers | 370/41 |

FOREIGN PATENT DOCUMENTS

| 3006110 | 8/1981 | Fed. Rep. of Germany . |
| 1492035 | 7/1967 | France . |
| 2005965 | 4/1979 | United Kingdom . |

OTHER PUBLICATIONS

IBM Technical Disclosure Bulletin, vol. 18, No. 1, Jun. 1975, pp. 211–212, "Code Independent Message Framing Format", by Donnan.

Computer Design, vol. 14, No. 3, Mar. 1975, pp. 81–87, "Hardware Consideration for High Level Data Link Control Communication", by Cooper.

Electrical Communication, vol. 52, No. 1, Jan. 1977, pp. 74–79, "Digital Multiplex Signals for Data Transmission", by Dinglinger.

Primary Examiner—Robert L. Griffin
Assistant Examiner—Stephen Chin
Attorney, Agent, or Firm—John B. Frisone

[57] ABSTRACT

In the modem based data transmission system the transmitting section provides a bit from each terminal (DTE) to be stored into a transmission buffer register (BX) under the control of an external clock signal derived from a modem internal transmission clock signal. The contents of the transmission buffer register is transferred into a transmission shift register and then transferred toward the modem through a formatting logic circuit wherein so-called stuffing bits and synchronization or flag characters are being inserted. Opposite operations are performed in the receiving section of the data transmission system.

6 Claims, 9 Drawing Figures

DATA TRANSMISSION SYSTEM

DESCRIPTION

1. Technical Field

This invention relates to a modem based data transmission system for transmitting data provided by a set of data sources operating at low rate, over a high speed channel.

2. Technical Background

The bandwidths of transmission channels and, more particularly, of telephone lines, do not allow digital data to be transmitted without having previously been submitted to a so-called "modulation" process. As a consequence, a "demodulation" operation is to be performed at the receiving end, for retrieving the original digital data. Both ends of the transmission channel must thus be provided with a modem (modulator/demodulator). In addition, the transmission equipments are so expensive that high transmission rates (high number of bits per second) are generally looked for. But some sources provide data at relatively low rates. Therefore, it is of interest to have means for concentrating or multiplexing data provided by several sources, and sending these data through a single modem. For this purpose, a multiplexer-demultiplexer is provided for handling data bits between the sources and the modem which then, may be called a "multiplexed" modem. In fact, this denomination covers the association of a multiplexor with a conventional modem; It should be noted that, in practice, the term "Modem" is often used for designating a multiplexer/demultiplexer and modem assembly. This denomination might be used in this specification.

The so-called "Double Side Band-Quadrature Carrier Modulation" technique (DSB-QC) is often used in multiplexed modems. This technique uses the amplitude modulation of two carriers in quadrature. To each combination of a group of bits to be transmitted, is associated a symbol representing a point of the complex plane defined by using normal axis reference system, each of the axis representing one of the carriers.

In a modem transmitting at 9600 bits per second (bps) or 2400 bauds, the bits provided by the terminals (sources) which are linked to the modem, are assembled into groups of four bits called "quadbits". Each quadbit configuration defines a symbol to which corresponds an amplitude combination of the carriers. The symbols are periodically submitted to the modulator at the so-called "signalling" times. The time interval between two signalling times defines a so-called "baud" time. Thus, for a 9600 bps transmission rate and with the bits grouped into quadbits, the modulator is used at the rate of 9600/4=2400 bauds.

When using four sources A, B, C, D linked to the modem at 9600 bps, the quadbits can be assembled as indicated in Table I below:

TABLE I

| Global Rate (bps) | Active Channel (sources) | Rate of the Active Channel (bps) | Allocation (QUADBIT) | | | |
|---|---|---|---|---|---|---|
| | | | Q1 | Q2 | Q3 | Q4 |
| 9600 | A | 9600 | X | X | X | X |
| | A | 4800 | X | | X | |
| | B | 4800 | | X | | X |
| | A | 4800 | X | | X | |
| | B | 2400 | | X | | |
| | C | 2400 | | | | X |
| | A | 2400 | X | | | |

TABLE I-continued

| Global Rate (bps) | Active Channel (sources) | Rate of the Active Channel (bps) | Allocation (QUADBIT) | | | |
|---|---|---|---|---|---|---|
| | | | Q1 | Q2 | Q3 | Q4 |
| | B | 2400 | | X | | |
| | C | 2400 | | | X | |
| | D | 2400 | | | | X |

For a detailed description of Table I, one should refer to the copending U.S. application Ser. No. 368600 filed Apr. 15, 1982. It should be noted from this table that a maximum of four channels can be served. If one of the channels is to be connected, through sub-channels, to terminals operating at a rate of 1200 bps, an additional logic device should be provided for directing the bits toward their addressed sub-channels or for retrieving said bits therefrom. This operation is not as simple as it appears at first sight. In fact, if a conventional multiplexing/demultiplexing operation is performed, a faulty orientation is possible, since there would be no original reference for determining the first terminal to be served. Then, it was considered to use devices stochastically directing the bits towards the terminals at 1200 bps, i.e., in accordance with the contents of the bit train on the channel serving the two corresponding sub-channels. Said devices have been described in U.S. Pat. No. 3,912,872 to the same assignee. It should be noted that scramblers are used at the transmitting end for enabling evenly distributing the bits over the individual sub-channels. At the receiving end, each sub-channel receives the data at a mean rate close to 1200 bps over a time interval which is long enough. In fact, the bits are provided over each sub-channels by bursts at an instantaneous rate of 2400 bps.

While showing some advantages, the so-called stochastic devices are not well suited to be used in a system comprising communication controllers which cyclically and steadily scan the lines (or sub-channels).

Then, the instantaneous rate of the bit stream over the sub-channels should preferably be steady and as close as possible to the nominal rate of the terminal connected to each sub-channel.

SUMMARY OF THE INVENTION

An object of this invention is to provide a device allowing terminals to be connected to a modem, in particular to a not-multiplexed modem, and to be served at a rate close to their nominal rate.

More particularly, the terminals are controlled by so-called clock means operating at a rate close to their nominal rate. The group of bits obtained from the terminals during each clock cycle, is serialized towards a modem after the insertion of so-called formatting binary elements (bits) thereto. The resulting bit train submitted to the modem, can have the nominal rate of the transmission channel of said modem, in which case bit grouping for determining the symbols is readily performed by sequentially dividing said bit train.

BRIEF DESCRIPTION OF THE DRAWINGS

The invention will be more readily understood with reference to the accompanying description taken in conjunction with the following drawings in which.

DETAILED DESCRIPTION OF THE PREFERRED EMBODIMENT

Figure 1:
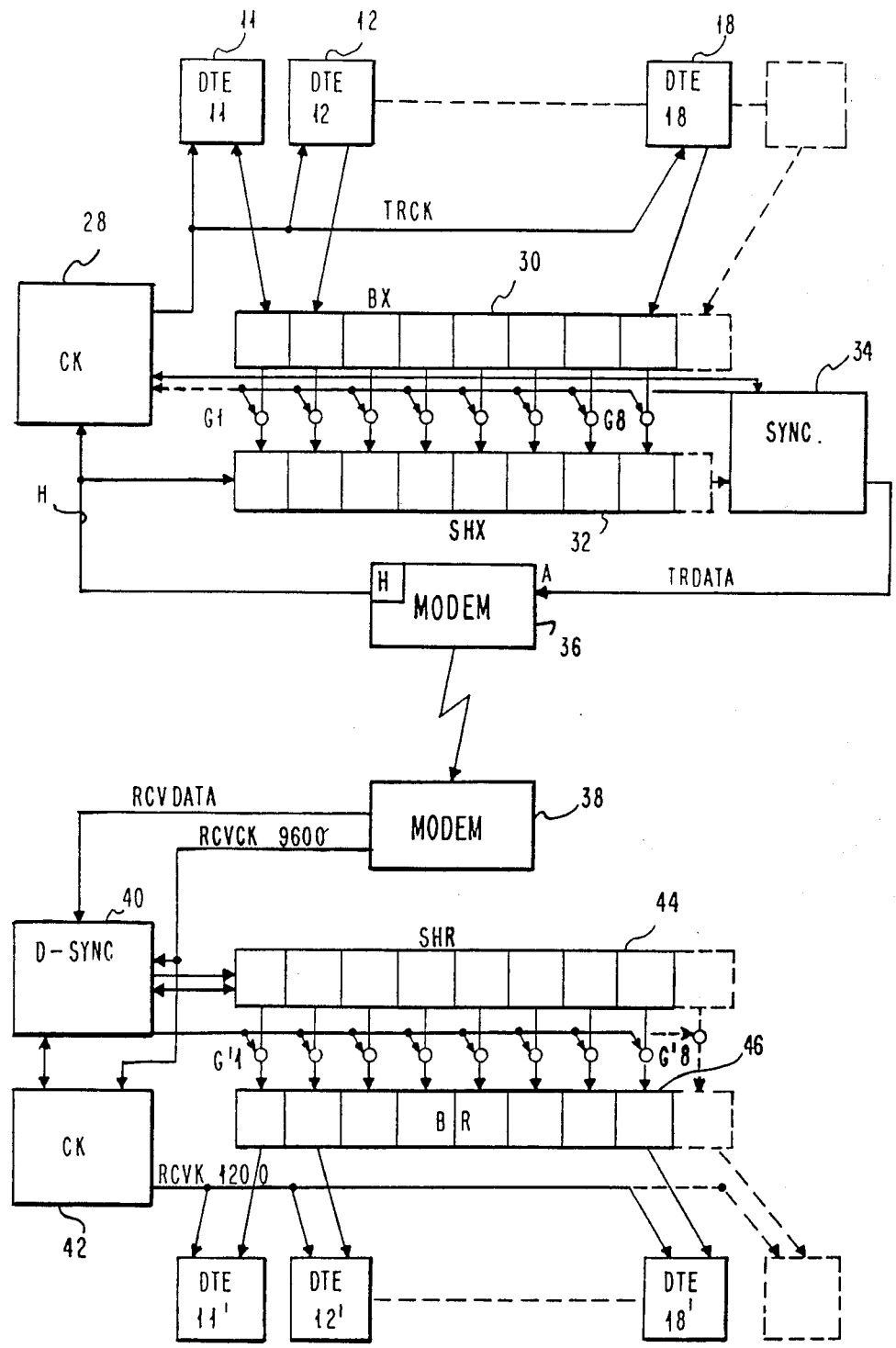
FIG. 1 illustrates an embodiment of the invention.

With reference to FIG. 1 an embodiment of the invention is represented. A transmitting set of terminals (DTE) referenced 11, 12, 13, ... , 18, are adapted to operate at a nominal rate of about 1200 bps. Each of said terminals provides a data bit (subsequently considered as pure data) under the control of a clock 28 (Transmit Clock CK) providing a so-called external transmission clock signal (TRCK). This bit is stored into a transmission buffer register (BX) 30. Each bit position of the transmission buffer 30 is connected to a bit position of a transmission shift register (SHX) 32 through a gate G1 to G8. Said transmission register 32 is used for serializing the transmission buffer register bits. The contents of the transmission buffer 30 is unloaded into the shift register through the gates G1 through G8. The series output of register 32 is fed into a transmission formatting logic circuit (SYNC) 34. This logic circuit formats the bit train received from shift register 32 into a synchronous HDLC bit train, for instance. The so-formatted bit train (TRDATA) is fed through input A of the transmitter part 36 of the modem e.g. IBM modem 3865 (not provided with its multiplexer) or another not multiplexed modem available on the market and provided with similar features. The internal transmission clock (H) of modem 36 is used both for synchronizing clock 28 and for shifting the contents of the transmission shift register 32.

It should be noted that although the number of terminals is of 8 in this specification, this is not a requirement. It will be understood through the following description of the operation of the device of this invention, that this number can be lower or higher than 8 (see the portion in dotted line in FIG. 1).

It should also be noted that it has been chosen, in this specification, to drive a 9600 bps modem through its 9600 bps input. This is not an absolute requirement. The operating rate of the modem is chosen in accordance with the number of terminals to be served and with the features thereof. It is even possible to use the invention over several channels of a multiplexed modem such as the IBM 3865 modem.

On the receiving side 38 of the modem the received wave carries data information (symbols) only at well determined times, i.e. the so called signalling instants.

For retrieving these data, the received signal should be sampled at appropriate times, i.e. not only at the same rate as the one used at the transmission end, but also in phase therewith.

The received wave contains both the data and a so-called receive clock information. Various receiving systems and devices for retrieving this clock information are known in the prior art. One may refer for instance, to U.S. Pat. No. 4,039,748, entitled "Method and Device for Synchronizing the Clock in a data transmission system". One may also refer to U.S. patent application No. 4,309,770 herein incorporated by reference.

Therefore, one can refer to the above-cited documents for a detailed description of the operation of a modem receiver. As to this invention, it should be noted that the modem receiver 38 provides, both, a received data bit train at 9600 bps (RCVDATA) and, a so-called internal receive clock signal (RCVCK 9600). The RCVDATA bits are in principle identical to those issued from the transmission formatting logic circuit SYNC 34. The bit train RCVDATA is applied to a reformatting logic circuit (D-SYNC) 40. The internal receive clock signal is fed into a receive clock circuit (CK) 42 which generates a so-called external receive clock signal at 1200 cycles per second. The internal receive clock signal is also used for controlling the shifting operations within a receive deserializer (SHR) 44 loaded with the reformatted data bit train derived from the bit train RCVDATA through the reformatting logic circuit 40. The clock 42 is used for controlling, through logic circuit 40, the transfer of the contents of shift register 44 into a receive buffer register (BR) 46. This transfer is performed through gates G'1 to G'8. The bit positions of buffer register 46 are respectively connected to addressed terminals belonging to a receiving set of terminals referenced 11'-18'. The transfers of bits between buffer register 46 and terminals 11'-18' are controlled by external receive clock signal RCVK 1200 from clock circuit 42.

Figure 2:
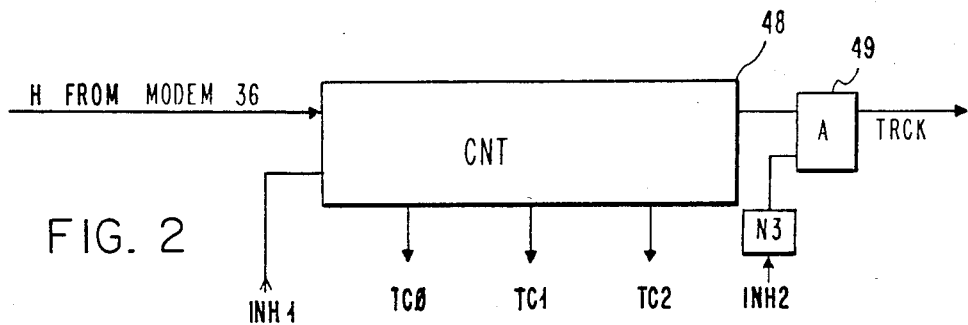
FIG. 2 illustrates an embodiment of circuit 28 of FIG. 1.

FIG. 2 shows an embodiment of clock 28 comprising a three-stage binary counter 48 (CNT), associated with an AND gate (A) 49. The counter is controlled by the clock signal H provided by modem 36. This signal has a period of 1/9600 seconds. The stepping of counter 48 can be inhibited for one step by logic circuit 34 through input INH1. The signal issued from the third stage of counter 48 constitutes information TRCK. Thus, when the contents of counter 48 goes from the decimal value 7 down to zero, each terminal (DTE) 11 to 18 transfers a data bit into the corresponding stage of buffer register 30.

Outputs TC0, TC1 and TC2 resulting from the decoding of status 0, 1 and 2 of counter 48, are provided for logic circuit (SYNC) 34. After being inverted through N3, the clock inhibit signal referenced INH2 opens the gate 49.

Figure 3:
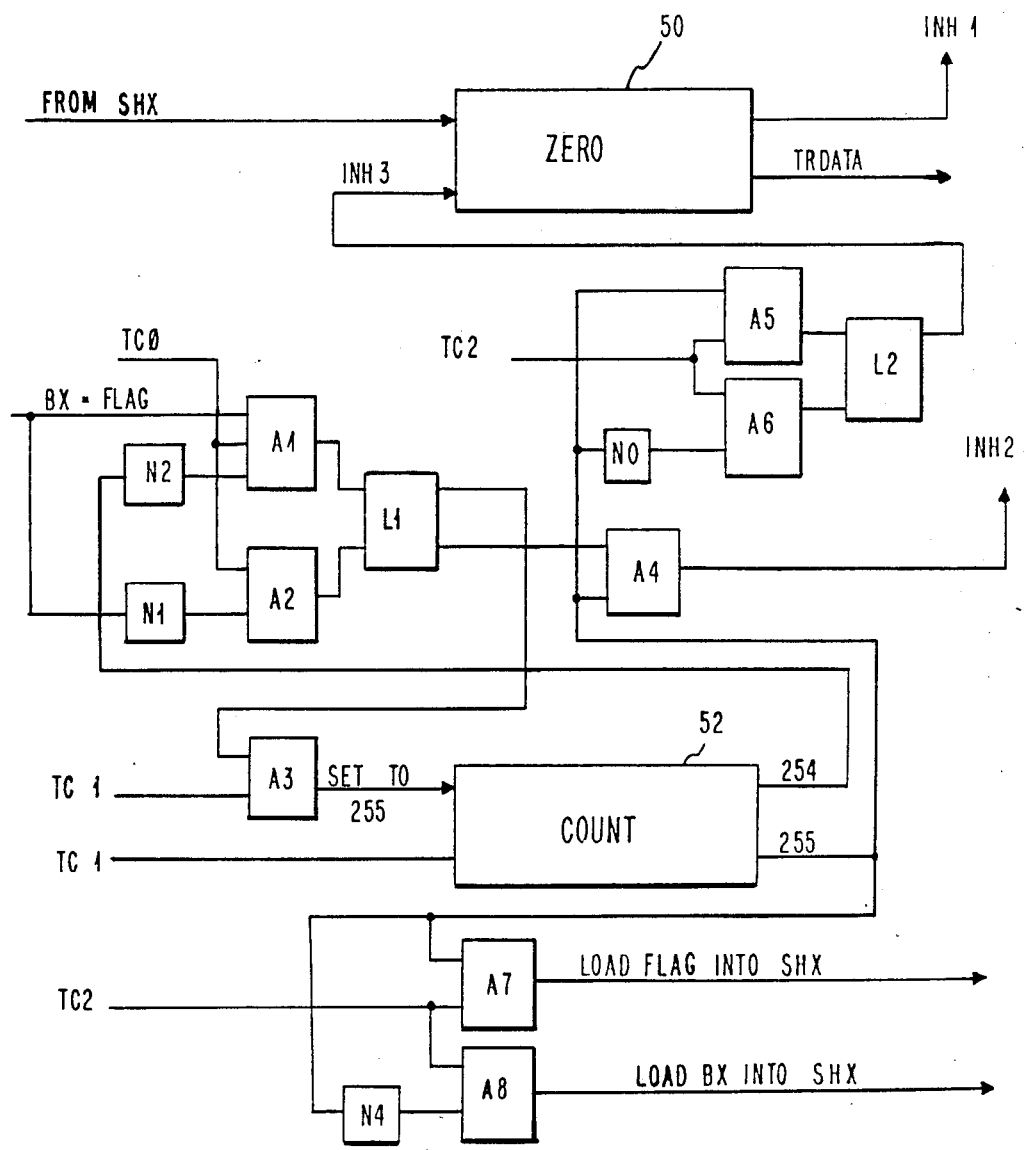
FIG. 3 is a functional diagram of circuit 34.

FIG. 3 shows an embodiment of the transmission formatting logic circuit 34. It should be noted that this circuit is more particularly provided for inserting a binary zero (a so-called zero stuffing operation) after each train of five contiguous binary ones obtained from the output of transmission shift register 32. The purpose of this operation is to ensure the transparency of the bit train to be transmitted, in accordance with the rules relative to synchronous transmission of the HDLC type, for instance. Logic circuit 34 also inserts a 1-byte HDLC flag every 256 bytes, so as to allow the system to be synchronized at the level of the transmitted bytes. The zeroes and flag insertion decreases the useful bit rate by about 1-2%, which is practically acceptable since terminals DTE 11 to 18 can then operate at a rate close to their nominal rate of 1200 bps.

The device 50 for inserting (stuffing) zeroes, is provided with an input connected to the series output of shift register (SHX) 32, and with an inhibit input INH3. Circuit 50 is provided with two outputs, one output providing the signal INH1 for counter 48, the second output providing the bit train TRDATA to the input of modem 36. The signal TCO provided by counter 48 is sent to one of the inputs of two AND gates referenced A1 and A2. The second input of A1 is raised to the 1 logic level when the buffer register BX contains the flag or more precisely, when a logic signal BX=Flag at the 1 level is provided by a conventional decoder (not shown) decoding the contents of register BX. This indication is also sent to the input of circuit A2 through an inverter N1. A third input of circuit A1 receives, through an inverter N2, a signal indicating that byte counter 52 (an 8-binary stage counter) contents reaches the decimal value 254. The counter 52 is provided with two inputs, one input directly receiving signal TC1, the second input receiving same signal TCI through AND gate A3, the second input of which is connected to an output of a latch L1. The latch L1 is controlled by the outputs of gates A1 and A2. The output of A3 is used to set counter 52 to the decimal value 255. The output "255" of counter 52 is connected to the input of a gate A4 the second input of which is connected to an output of latch L1. The output of gate A4 provides the clock signal INH2. The output "255" signal from counter 52 is directly connected to the input of an AND gate A5 and through an inverter NO, to the input of an AND gate A6. The second inputs of gates A5 and A6 are fed with the signal TC2 from counter 48. The outputs of gates A5 and A6 control a latch L2 the output of which provides the signal INH3. The output "255" of counter 52 is also directly connected to the input of a gate A7 and through an inverter N4, to the input of a gate A8. The second inputs of gates A7 and A8 are fed with the signal TC2. The outputs of gates A8 and A7 respectively control the transfer of the contents of the buffer register BX into the shift register SHX and the loading of a flag into SHX. These controls are referenced "LOAD BX INTO SHX" and "LOAD FLAG INTO SHX", respectively.

In operation, when the device 50 for inserting zeroes is not inhibited by the signal INH3, it inserts a "0" into the bit train received from SHX each time five contiguous "1" have been detected therein. The flag byte which is, in this case, equal to "7E" in hexadecimal notation, is inserted into the data stream when the contents of byte counter 52 reaches 255. The insertion of zeroes is, of course, inhibited when the flag is sent. In fact, a flag can be inserted for two reasons. The first one being when the byte counter contents reaches 255 without any flag character being detected in the normal data stream of the contents of register 30 by a means not shown. Then a flag is inserted at the normal boundary of a byte. Such a flag is called synchro flag and will be recognized at the receiving end and discarded from the data stream. The second case is when a flag character is detected in the data stream. In other words, when the register BX contains a flag character. In this case, this so-called data flag is transmitted without any zeroes stuffing and contributes to the synchronization of character reception. Such a flag, after being recognized at the receiving end, is not, however, discarded from the data stream.

Consequently, when a flag is recognized in the BX register (by a device not shown comparing each byte to be transmitted with character "7E"), the signal BX=Flag is raised to the 1 logic level. Then, byte counter 52 is set to 255 except if said contents was equal to 254 on the previous step. In this case, the flag is a portion of the data to be transmitted and INH2=0. This permits to avoid mistaking a data flag for a synchronization flag. The status of the byte counter contents when reaching 255 causes the flag to be loaded into register SHX and the zero stuffing to be inhibited. When the contents of register BX is not a flag (the signal BX=Flag being at the logic level "0"), the clock CK providing the signal TRCK is inhibited for one cycle in order to allow the flag to be transmitted.

In other words, when the contents of register BX is a flag, a compare circuit (not shown) provides a signal BX=Flag at the 1 logic level. The operations which are then carried out, depend on the contents of counter 52. If counter 52 does not read 255, i.e. if at the end of the previous step, i.e. when TC$\emptyset$=1, this contents was not equal to 254, the following is experienced:

the output of AND circuit A1 is at the 1 logic level, which sets latch L1 into status 1,
the complementary output of latch L1 being at zero, the output of A4 is at zero, therefore inhibit signal INH2=0. The signal TRCK goes through gate 49, counter 52 is set to 255 when TC1=1,
status 255 of couner 52 triggers L2 via A5, which prevents stuffing zeroes from being inserted during the flag transmission,
when TC2=1, a flag is loaded into register (SHX) 32 since signal "LOAD FLAG INTO SXH" has been raised to the 1 level. In fact, the flag in use is the one stored in a circuit not shown instead of the one contained into register BX.

When the counter 52 contents reaches 255 at the time defined by TC1, the situation is as follows:

latch L1 cannot be set to 1 at the time defined by TC$\emptyset$ since the counter reads 254 (it is incremented at the time define by TC1),
clock TRCK is inhibited through gate A4,
a flag is loaded into register SHX 32, at the time defined by TC2, due to the rising of signal "LOAD FLAG INTO SHX" to the 1 logic level by the opening of gate A7,
the insertion of stuffing zeroes is, then, inhibited by latch L2.

Figure 4:
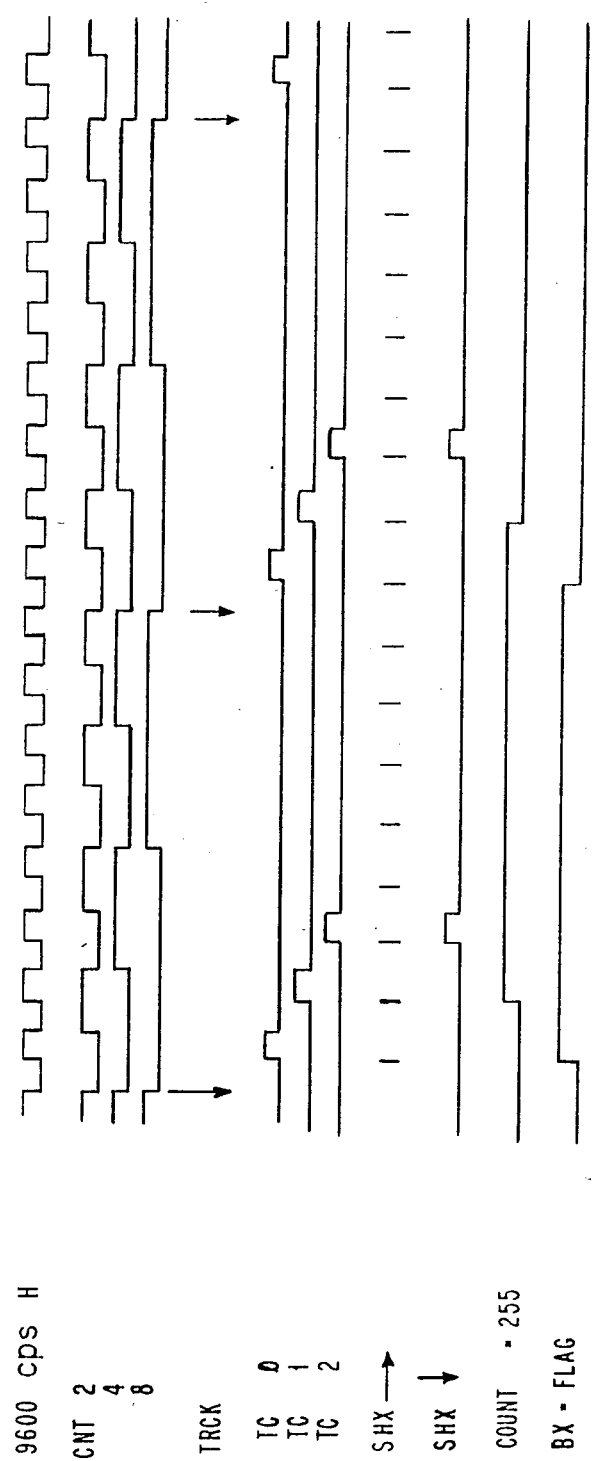
FIG. 4 is an operating diagram of the transmitting devices shown in FIG. 1.

The operating diagram of the above described transmission devices is shown in FIG. 4. The first line represents a clock signal H at 9600 cycles per second. This signal is applied to counter 48 which, after three divisions-by-two, provides signals at 1200 cycles per second (line 4 of the diagram). The fifth line represents signal TRCK which controls the loading of a bit from each terminal 11-18 into buffer register (BX) 30. Lines 6, 7 and 8 represent the signals TC$\emptyset$; TC1 and TC2 provided by decoding status 0, 1 and 2 of counter 48.

Line 9 (SHXT) indicates the times when the contents of register SHX is shifted by one bit position.

Line 10 (SHXO) indicates the times when register (SHX) 32 is loaded.

Line 11 is at a high level for the 255$^{th}$ byte as determined by counter 52.

Line 12 is at a high level when buffer register (BX) 30 contains a byte identical with flag "7E", i.e. when BX=Flag.

Figure 5:
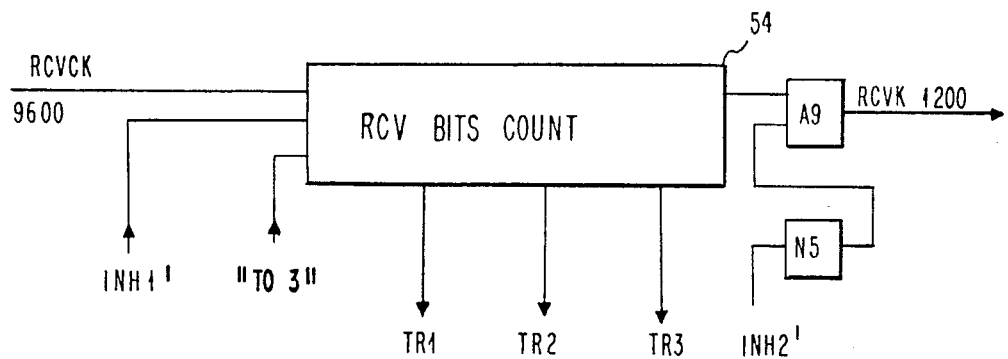
FIG. 5 is a functional diagram of circuit 42.

FIG. 5 shows a functional diagram of the receive clock 42. This clock is similar to the transmit clock and comprises a 3-stage binary counter (RCV BITS COUNT) 54 controlled by the internal receive clock signal RCVCK at 9600 cycles per second. The stepping of this counter can be inhibited for one cycle by a signal INH1' provided by logic circuit (D-SYNC) 40. The output of the third stage of the counter provides the external receive clock information RCVK at 1200 cycles per second, which allows terminals DTE11' to DTE18' to receive the bits from the receive buffer register (BR) 46. Therefore, when the contents of counter 54 decreases from 7 to zero, each terminal receives a data bit stored in a bit position of register 46. The output of counter 54 at 1200 cycles per second is transmitted through a gate A9 the opening of which is controlled by a clock inhibit signal INH2' inverted through N5.

Status 1, 2 and 3 of counter 54 are decoded and transmitted to outputs TR1, TR2 and TR3, respectively.

A "TO 3" input allows the contents of bit counter 54 to be set to the decimal value 3.

Figure 6:
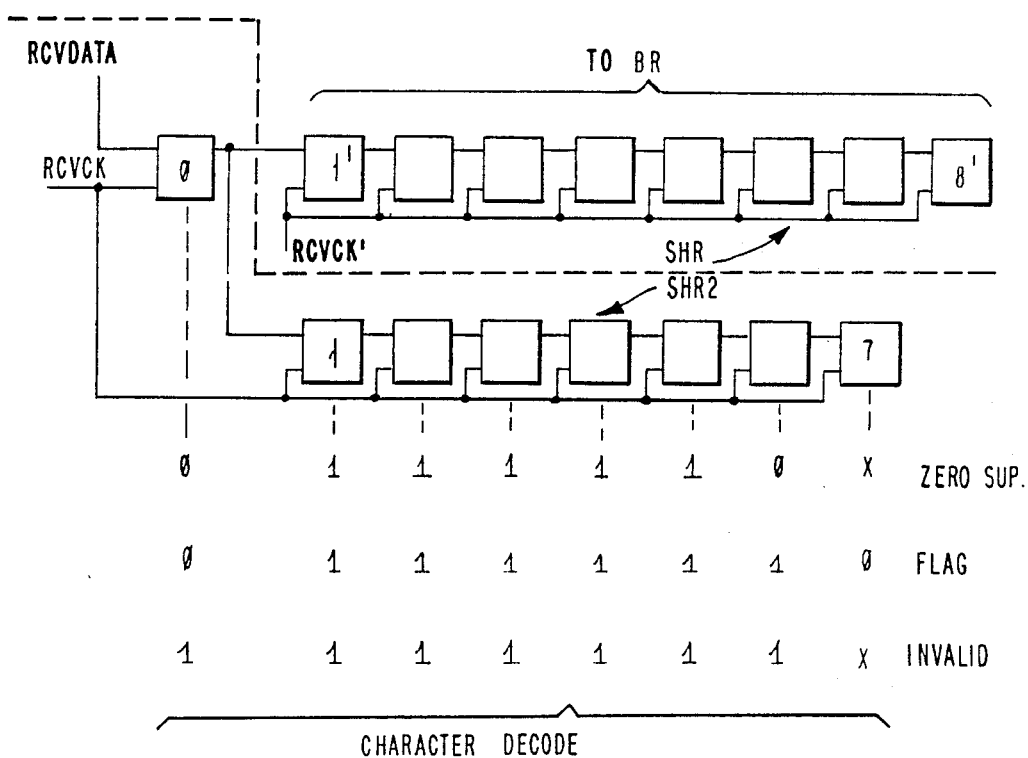
FIG. 6 schematically illustrates shift register (SHR) 44 and a portion of the logic circuit 40.

FIG. 6 shows an embodiment of shift register (SHR) 44 combined with a portion of the reformating logic circuit 40. As shown if FIG. 6, two registers (SHR and SHR2) are represented, arranged in parallel with a first common stage (not belonging to SHR), and a character decoding logic (not shown) allowing the contents of register SHR2 to be decoded as shown later on. The first stage receives the data bit train RCVDATA clocked by the internal receive clock signal (RCVCK) provided by the modem 38. A clock signal RCVCK' used for controlling the shifting within the receive deserializer SHR is similar to signal RCVCK, but it can be inhibited for a clock cycle by logic circuit (D-SYNC) 40 so as to allow the so-called zero suppress (or delete) operation to be carried out. The purpose of this operation is to delete the stuffing zeroes. As shown in FIG. 6, a simple decoding of the contents of register SHR2 enables detecting certain conditions. This decoding is performed by using a simple compare device of a conventional type (not shown). The decoding of the contents of stages 0 to 7 allows the detection of a "Flag" character (or a flag having value 7E in hexadecimal notation) or of an invalid character. The decoding of the contents of stages 0–6 indicates the so-called stuffing zeroes (0111110) which should be discarded from the received data. This information is used by the other portion of logic circuit 40 an embodiment of which is shown in FIGS. 7 and 8.

Figure 7:
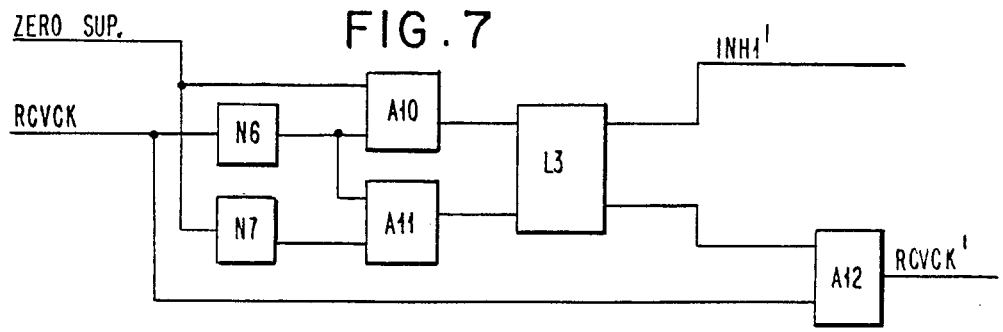
FIGS. 7 and 8 illustrate an embodiment of portion of logic circuit 40 shown in FIG. 1.

FIG. 7 shows a second portion of the circuits of logic device (D-SYNC) 40. This circuit comprises two inverters N6 and N7. Inverter N7 receives information "zero SUP" (see FIG. 6) indicating the presence of stuffing zeroes to be discarded. Inverter N6 receives the internal receive clock information at 9600 cycles per second (RCVCK). The output of N6 drives two AND logic circuits (gates) A10 and A11. The second input of A10 also receives zero suppress information "zero SUP". The second input of A11 is connected to the output of N7. The outputs of A10 and A11 drive a latch L3. The normal output of L3 provides cycle inhibit signal INH1'. The inverted output of L3 is connected to one of the inputs of a AND logic circuit A12 the second input of which receives the clock signal at 9600 cycles per second (RCVCK). The output of A12 provides signal RCVCK'.

Figure 8:
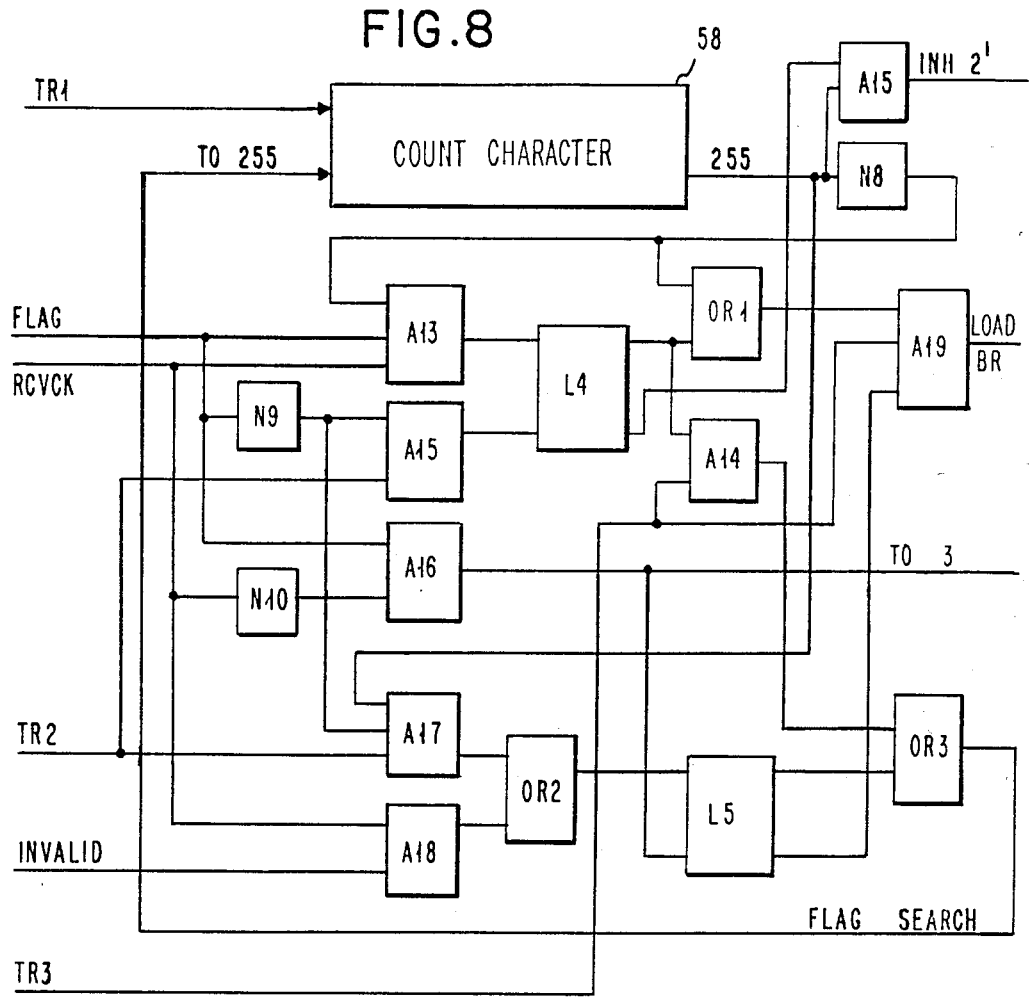

The device of FIG. 8 is the third and last portion of logic circuit (D-SYNC) 40. The signal TR1 provided by counter 54 is applied to the input of character counter (bytes) 58 comprising eight binary stages, therefore counting from zero to 255. The counter output indicating that the contents of said counter has reached 255, is inverted through N8. The output of N8 drives both logic AND circuit A13 and logic OR circuit OR1. The second input of A13 receives from the device of FIG. 6, the so-called FLAG indication (Flag 7E). A13 is also provided with a third input receiving signal RCVCK.

The output of A13 drives a latch L4 the normal output of which is connected to both circuit OR1 and AND circuit A14. The inverted output of latch L4 is connected to the input of a AND circuit A15 the second input of which is connected to output 255 of counter 58. The output of circuit A15 provides the clock inhibit signal INH2'. The flag presence indication (see FIG. 6) is also applied to two AND circuits A15 (through an inverter N9) and A16. The output of A15 is connected to the input of latch L4. The output of inverter N9 is connected to one of the inputs of a AND circuit A17 provided with two other inputs respectively receiving the signal indicating that counter 58 has reached a count of 255 and signal TR2 (see FIG. 5). Same signal TR2 is also applied to circuit A15. The output of circuit A17 is connected to one of the inputs of an OR circuit OR2 the second input of which is connected to the output of an AND circuit A18. The two inputs of A18 respectively receive signal RCVCK, and indication "INVALID" (see FIG. 6). The signal RCVCK is also applied to the input of A16 through an inverter N10. The output "TO 3" of A16 is used to set the contents of bit counter 54 to three. The signal TR3 provided by counter 54 is simultaneously applied to the input of circuit A14 and to the input of another AND logic circuit A19. Circuit A19 also receives the signal issued from OR1 and the complement signal (inverse) issued from a so-called flag search latch L5. The inputs of L5 are connected to the outputs of A16 and OR2. The normal output of L5 is connected to the input of an OR logic circuit OR3 the second input of which is connected to the output of A14. The output of OR3 is used to set counter 58 to value 255. The output of circuit A19 provides information LOAD BR used for controlling the transfer of the contents of register (SHR) 44 into register (BR) 46 by controlling the opening of gates G'1 to G'8 (see FIG. 1). Said SHR contents when transferred into BR will constitute pure data information, i.e. free of any stuffing zeros and flags.

The circuit (D-SYNC) 40 ensures three main functions, namely:
 suppression of the stuffing zeroes: when five contiguous bits equal to "1" are detected in the received bit stream, the following zero is suppressed. For this purpose, the clock signal of stages 1' to 8' of register SHR1 is inhibited for one cycle. This function also inhibits the flag and invalid character detections for the following bit cycle;
 Flag detection: when a flag is detected in the received bit stream, one of the two following decisions is taken:
  if the contents of character counter 58 is equal to 255, the received flag is a synchronization character. It is discarded from the received data stream by inhibiting the so-called LOAD BR function as well as the external receive clock signal at 1200 cycles per second (RCVK 1200 bps) controlling terminals DTE 11' to 18';
  if the contents of the character counter is different from 255, the received flag is a portion of the received data stream, i.e. pure data information provided for the terminals. This signal sets the character counter to 255 and the bit counter to 3 if the latter does not already reads this value. This allows character synchronization to be recovered in case of a synchro loss since the last 256 character frame;

search for flag: the control of logic circuit 40 is set into flag search mode at the receive initialization time or after a pause or the detection of a loss of synchronization. In this condition, no data are delivered to the terminals until a flag is detected for re-synchronizing both character counter 58 and bit counter 54.

A flag search is more particularly performed in the following cases: at power-on of the receiver; when, the character counter indicates that more than 256 characters have been received without flag; or when an invalid configuration of bits is detected in the received data stream.

In other words, depending whether the counter 58 reads or not 255 and depending on the logic level of the so-called "Flag 7E" or "FLAG" signal, the receiving circuits can be in one of the following conditions:

The counter 58 does not read 255 and the FLAG signal (Flag 7E) is at the 1 logic level:
the latch L4 is switched to status 1, i.e. the status in which its upper output terminal (see FIG. 8) is at the 1 logic level,
the counter 58 is set to 255 at the time defined by TR3 by means of circuits A15 and OR3,
the register BR is normally loaded by means of OR1 and A19,
and the counter 54 is set to 3 if it does not already read this value, the counter 58 reads 255 and the FLAG signal (Flag 7E) is at the 1 logic level:
the circuit A13 holds the latch L4 at zero,
the circuit A19 provides a signal "LOAD BR" at the 0 logic level,
the signal RCVCK is inhibited by INH2', the counter 58 reads 255 and the FLAG signal (Flag 7E) is at the 0 logic level or the "INVALID" signal is at the 1 level,
on TR2, latch L5 is set into status 1,
signals "Load BR" and RCVCK remaining inhibited, INH2"=1. The counter 58 remains at 255 (through OR3). The receive circuits remain in synchronization search mode until the FLAG signal is set to the 1 level and resets latch L5 to zero (through A16). The same signal resets counter 54 into position 3.

Figure 9:
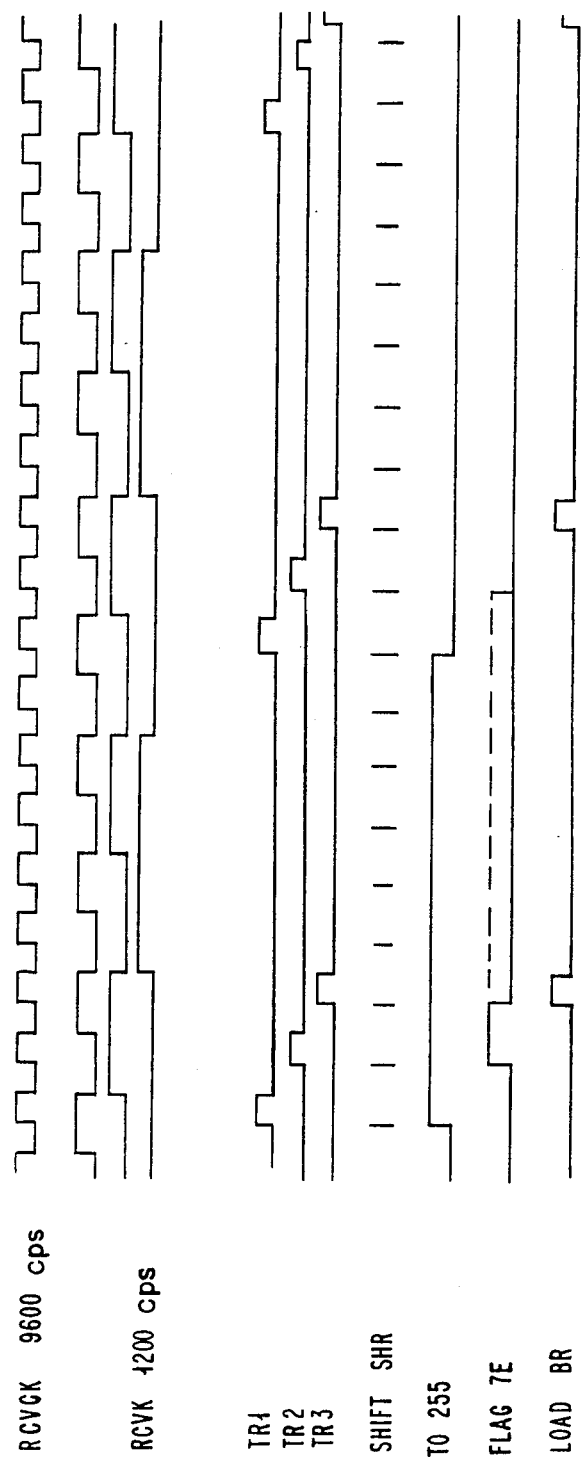
FIG. 9 is a functional diagram of the receiving devices shown in FIG. 1.

FIG. 9 shows a receive operation time diagram. The first line represents internal receive clock signal RCVCK at 9600 cycles per second, provided by modem 38. The frequency of this signal is divided by 8 to provide external receive clock signal RCVK 1200 cps (see FIG. 1) controlling the transfers of the received bits towards terminals DTE 11' to 18'. The byte counter 54 provides the next three signals (TR1, TR2, TR3). The logic circuit 40 derives from the above-indicated signals, an information SHIFT SHR controlling the bit shifting within the register (SHR) 44.

The next line shows a so-called "TO 255" signal used to set the contents of character counter 58 to the decimal value 255.

The last two lines respectively show the so-called Flag 7E (or FLAG) signal and the so-called LOAD BR signal.

While the invention has been described as applied to a preferred embodiment of this invention, it will be obvious to those skilled in the art that various changes and modifications may be made therein without departing from the invention. In particular, the transmission rates and the number of terminals can be different from the one chosen above.

We claim:

1. A data transmission system comprising a transmit section and a receive section for exchanging pure data information between a transmitting set and a receiving set of data terminals through modem units provided with internal clock means, said system including:
at the transmitting site:
a transmission buffer register each individual bit position of which is connected to a respective terminal of said transmitting set of data terminals;
transmit clock means responsive to the modem internal transmission clock for providing an external transmission clock signal controlling the loading of said transmission buffer register by said pure data information provided by said transmitting terminals;
a transmission shift register connected to said transmission buffer register;
means for unloading the contents of said transmission buffer register into said transmission shift register;
transmission formatting means connected to said transmission shift register and to said transmit clock means;
means for serializing said transmission shift register contents bit shifting it into said transmission formatting means wherein said contents is formatted into a synchronous bit train and provided to said modem for being transmitted;
means for examining the contents of said transmission shift register at the time it is loaded to detect the presence of a unique character, not normally found in data, and formed therein as a result of the combination of bits supplied by the respective terminals and for inhibiting the operation of said transmission formatting means and for resetting the same to an initial state; and,
at the receiving site:
receive clock means connected to the receiving modem;
a reformatting logic circuit connected to said receiving modem and to said receive clock means for converting the data provided by the receiving modem into a pure data bit train and for assuming a first state upon the receipt of a said unique character and a second state a predetermined time period thereafter;
a receive deserializer connected to said reformatting logic circuit for deserializing said pure data bit train;
a receive buffer register connected to said receive deserializer;
means for unloading said receive deserializer contents into said receive buffer register;
means for examining the contents of said receive deserializer immediately prior to unloading its contents into the receive buffer register to detect the presence of a said unique character and for inhibiting the unloading of the contents of the receive deserializer into the receive buffer when the said reformatting logic is in the said second state; and,
means connected to said receive clock means to control the transfer of said receive register contents into said receiving set of terminals.

2. A data transmission system according to claim 1 wherein said data terminals are made to operate at a low bit rate and said transmission between transmit and receive sites is made at a high bit rate, with said transmit clock means deriving said external transmission clock signal by dividing the modem internal transmission clock frequency by a coefficient substancially equal to the high rate to low rate ratio.

3. A data transmission system according to any one of claims 1 or 2 wherein said transmission formatting means includes means for inserting stuffing bits and flag characters into the serialized transmission shift register contents.

4. A data transmission system according to claim 3 wherein said bit stuffing operation is inhibited within flag characters.

5. A data transmission system according to claim 4 wherein said synchronous bit train is of the HDLC type.

6. A data transmission system according to claim 5 wherein said reformating logic circuit includes means for deleting the stuffed bits and the inserted flag characters.

* * * * *